A. C. LOOMIS.
EYEGLASSES.
APPLICATION FILED JUNE 8, 1916.

1,254,047.

Patented Jan. 22, 1918.

INVENTOR
Albert C. Loomis,
BY
Dyke & Canfield.
ATTORNEYS.

UNITED STATES PATENT OFFICE.

ALBERT C. LOOMIS, OF WEST ORANGE, NEW JERSEY.

EYEGLASSES.

1,254,047.  Specification of Letters Patent.  Patented Jan. 22, 1918.

Application filed June 8, 1916. Serial No. 102,572.

*To all whom it may concern:*

Be it known that I, ALBERT C. LOOMIS, a citizen of the United States, and a resident of West Orange, county of Essex, and State of New Jersey, have invented certain new and useful Improvements in Eyeglasses, of which the following is a specification.

This invention relates to an improved attachment for eyeglasses to permit the use of eyeglasses as such and to also permit the use of the eyeglasses as spectacles so as to prevent the eyeglasses from falling from the nose.

When eyeglasses are in place the position of the clips that hold the eyeglasses on the nose, is important to the wearer, as any other position carries with it a feeling of discomfort. My invention is designed to provide a temple for each lens which does not interfere with the position of the eyeglass clips because it lack rigidity and has a strand which does not stretch but is limp, and while preventing undue vibration or motion of the eyeglasses and thus preventing their shaking loose, it does not force the eyeglasses to any particular position to destroy the said nose position of the clips.

Many persons prefer to use eyeglasses for their neater appearance, but when working or engaged in anything that tends to dislodge the eyeglasses they use spectacles. This makes it necessary to provide two separate sets of lenses, but this invention is designed to provide an easily and quickly adjusted removable temple for each lens so that the eyeglasses can be utilized as a pair of spectacles.

The invention is further designed to provide a temple for eyeglasses which is removably attached to a lens preferably by sliding it on the lens longitudinally, although other means of attachment can be used, and providing such detachable fixture or lens-engaging part with a limp strand, that is one that lacks stability or any definite form, which in turn is provided with an ear-engaging part.

Figure 1:
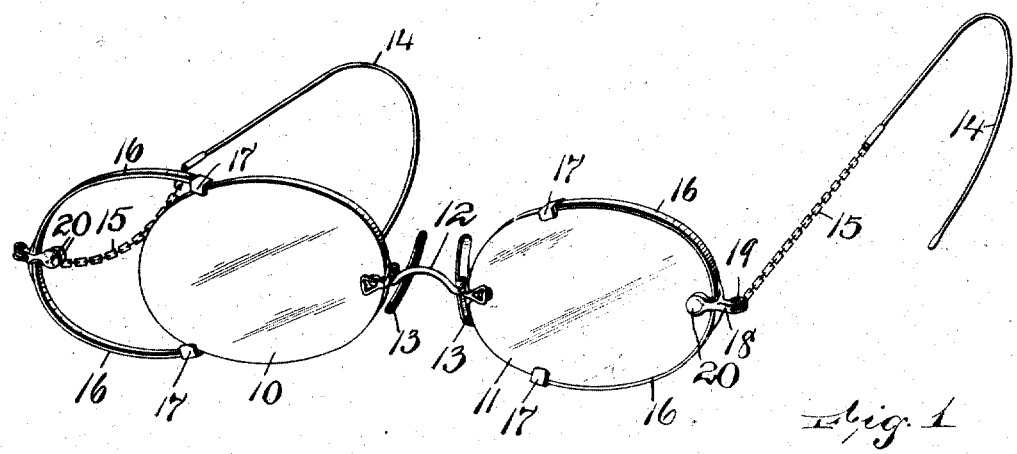
Figure 2:
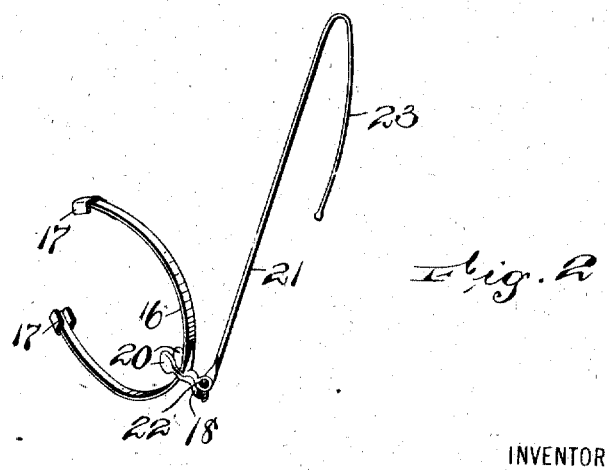

The invention is illustrated in the accompanying drawing, in which Figure 1 is a perspective view of a pair of eyeglasses, one of the lenses having a form of my improved temple attached thereto, the other temple being in the position it occupies when about to be attached to one of the lenses. Fig. 2 is a perspective view of one of the temples, this temple being of a modified form of construction and comprising a rigid strand connecting the ear-engaging part with the portion that is attached to the lens.

The eyeglasses can be of any usual type, the pair illustrated consisting of lenses 10 and 11 connected by a bridge 12 provided with any of the ordinary or usual form of clips 13 which have a spring action in most eyeglasses, such clips being adapted to tightly clasp the nose of the wearer and hold the glasses in position. When eyeglasses are thus worn and held in place by pinching the nose, they are usually not firm enough for the wearer to engage in any labor that is calculated to make them shake unnecessarily or to be dislodged from position on the nose. It is thus usually necessary for the wearer to have a pair of spectacles in addition to the eyeglasses, which spectacles are held in position by the temples which connect the lenses with the ear-engaging parts so that the eyeglasses are held in position and at the same time the wearer has a feeling of security.

In my new construction of temple I provide means for utilizing the eyeglasses as spectacles so that a temple on each lens and the clips fitting the nose can be worn at the same time without the temple interfering materially with the position of the clips on the nose. Each temple is provided with an ear-engaging part 14 usually made of wire and bent to approximately fit behind the ear, although sometimes these parts are made to engage the side of the head and only the top portion of the ear. The ear-engaging part is connected to the lens by a part without stability, that is, it is limp this part 15 being in the shape of a small chain or a spring or strand that has no elasticity to any extent. The length of this limp portion is regulated so that when the eyeglasses are on the nose and the ear-engaging parts are passed over the ears, the limp parts of the temples are not subjected to any longitudinal strain sufficient to cause any undue pressure or any displacing of the clips of the eyeglasses where they engage the nose of the wearer. In this way the position that the wearer is accustomed to have the clips placed is not shifted when the temples are passed over the ears, and the only time that the temples become subject to any longitudinal strain is when the eyeglasses are calculated to vibrate or to slip from the nose, in which case the limp part 15, such as the chain as illustrated, prevents this movement of the eyeglasses. In this way the security of the eyeglasses is assured, but at the same time the lack of rigidity in the temple strand prevents any strain on the eyeglasses with any tendency to shift the position of the clips that hold the eyeglasses in place.

The temple can be attached to the lens in a number of ways, but I prefer to place it on the lens by a detachable means so that the temples can be removed from the eyeglasses quickly without the use of tools and put on with equal speed so that the transformation from eyeglasses to spectacles and from spectacles to eyeglasses can be quickly accomplished and the wearer avoids the necessity and the expense, and also the inconvenience, of having two separate sets of lenses.

In the form of attachment shown the securing means for the strand of the temple comprises a loop 16 made of spring material and having an open side so that it can be slid over and snapped into place on the top and bottom edges of the lens, this grasping being possible by reason of the radius of the upper and lower arms of the loop 16 being slightly smaller than the radius of the top and bottom edges of the lens. To prevent the loop from slipping off transversely of the lens, and to also act as guides when the loop is being put into place or removed from the lens, I provide ears 17 which embrace the side edges at the top and bottom of the lens and facilitate the fastening of this securing portion, as will be evident. The loop is provided with a suitable bracket 18 to which the strand of the temple is secured, this being usually done by means of a screw 19 being passed through the bracket and also through the strand of the temple. To further prevent any lateral motion of the loop 16 on the lens I provide cheeks 20 which project adjacent to the bracket 18 and preferably on both faces of the lens. It will, of course, be understood that other forms of securing attachment can be utilized and equivalents of the ears 17 and the cheeks 20 can be employed to insure the placing of the spring loop 16 on the lens.

In Fig. 2 I show a similar temple except that the lens engaging part, as the loop 16, is provided with a substantially rigid strand 21 forming part of the temple and pivoted, as at 22, to the bracket 18 of the loop 16. The strand 21 is bent at its end into an ear-engaging part 23. This form has a substantially rigid strand 21 usually made of wire and it is adapted to be used on eyeglasses where the clips of the eyeglasses are not arranged to tightly grasp the nose and in which a slight movement of the clips is permissible.

Having thus described my invention, I claim:

1. Eyeglasses comprising a bridge piece having clips adapted to engage the nose of the wearer, and lenses supported by the said bridge piece; resilient loops carried by and detachably connected with the said lenses; comparatively rigid ear-engaging portions; and limp strands intermediate the said loops and the said ear-engaging portions and connected with each, and the lengths of which strands are such as to prevent strain on the lenses when the eyeglasses are in use.

2. Eyeglasses comprising a bridge piece having clips adapted to engage the nose of the wearer, and lenses supported by the said bridge piece; resilient loops conforming in their outline with the outer portions of said lenses and having ears at their extremities adapted to engage the upper and lower edges of the lenses, and cheek pieces at their middle portions adapted to engage the outer ends of the lenses; comparatively rigid ear-engaging portions: and limp strands intermediate the said loops and the said ear-engaging portions and connected with each, and the lengths of which strands are such as to prevent strain on the lenses when the eyeglasses are in use.

In testimony that I claim the foregoing, I have hereto set my hand, this 5th day of June, 1916.

ALBERT C. LOOMIS.